United States Patent [19]
Shindo et al.

[11] Patent Number: 5,603,048
[45] Date of Patent: Feb. 11, 1997

[54] MICROPROCESSOR WITH BUS SIZING FUNCTION

[75] Inventors: Keisuke Shindo; Takashi Nakayama, both of Tokyo, Japan

[73] Assignee: NEC Corporation, Tokyo, Japan

[21] Appl. No.: 582,022

[22] Filed: Jan. 2, 1996

Related U.S. Application Data

[63] Continuation of Ser. No. 180,918, Jan. 12, 1994, abandoned.

[30] Foreign Application Priority Data

Jan. 13, 1993 [JP] Japan ................................. 5-003716

[51] Int. Cl.[6] ........................................................ G06F 13/00
[52] U.S. Cl. ........................ 395/800; 395/307; 364/232.8; 364/240.2; 364/240.3; 364/DIG. 1
[58] Field of Search ............................... 395/800, 775, 395/306–311, 284, 280, 200.2; 370/85.1, 85.9, 85.13

[56] References Cited

U.S. PATENT DOCUMENTS

| | | | |
|---|---|---|---|
| 4,683,534 | 7/1987 | Tietjen et al. ........................ | 364/200 |
| 5,321,664 | 6/1994 | Akimoto ........................... | 365/230.03 |
| 5,341,481 | 8/1994 | Tsukamoto ........................... | 395/287 |
| 5,394,528 | 2/1995 | Kobayashi et al. ................... | 395/307 |
| 5,448,744 | 9/1995 | Eifert et al. ........................... | 395/800 |
| 5,493,656 | 2/1996 | Tsukamoto ........................... | 395/280 |
| 5,548,766 | 8/1996 | Kaneko et al. ........................ | 395/775 |
| 5,548,786 | 8/1996 | Amini et al. ......................... | 395/842 |
| 5,550,990 | 8/1996 | Keener et al. ........................ | 395/309 |

OTHER PUBLICATIONS

Andrew Veronis, Microprocesors hardware Applications, 1984, Some Aspects of Busing in some chapters.
Ayers, VLSI Silicon Compilation and the art of Automatic Microchip design, 1983, pp. 358–359.
Motorola, M68000 Family Reference, 1988, p. 3–116, p. 4–8, 9.

*Primary Examiner*—Alpesh M. Shah
*Attorney, Agent, or Firm*—Whitham, Curtis, Whitham & McGinn

[57] ABSTRACT

A microprocessor with a bus sizing function has internal data bus and external data bus having $2^n$ bit width, in which n is a natural number, for inputting and outputting data to and from said data path, $2^n$ interface circuits having a bus sizing function for using as a bus of $2^m$ bits, in which m is a natural number smaller than n, said interface circuit being connected to $2^{n-m}$ of internal data buses and $2^n$ pads for connecting said internal data bus to the external data bus via said interface circuit. Among said interface circuit and said pads, $2^{n-m}$ of said interface circuits and said pads associated with common internal data bus are aggregated as a block and arranged at close proximity to each other.

18 Claims, 6 Drawing Sheets

MICROPROCESSOR WITH BUS SIZING FUNCTION

This is a continuation of application Ser. No. 08/180,918, filed Jan. 12, 1994, now abandoned.

BACKGROUND OF THE INVENTION

1. Field of the Invention

The present invention relates to a microprocessor. More specifically, the invention relates to a microprocessor which can perform data communication with a system resource having mutually different data ports.

2. Description of the Related Art

In a microprocessor which performs external data communication, it becomes necessary to use a bus common to various resources, such as memory and so forth, for communication.

However, bus widths of the resources are not always the same as that of the microprocessor. For instance, it may become necessary to connect a memory or I/O device having 8 bit width or 16 bit width to the microprocessor of 32 bits. () As an approach to this, there has been provided microprocessor having a bus sizing function dynamically adapting the bus width to that of the resources.

FIG. 5 shows an example of bus sizing operation, which has been disclosed in "MOTOROLA MC6800 User's Manual" P.7-6. The bus sizing operation will be briefly discussed on the basis of the disclosure in the above-identified Publication. It should be noted that, in FIG. 5, numbers shown with [] represent a bit number.

The reference numeral 500 denotes a register within a microprocessor, 501 denotes an aligner having the bus sizing function and 502 denotes an external data bus of the microprocessor. The reference numerals 503, 504 and 505 denote respective ports having the bit width of 32 bits, 16 bits and 8 bits, respectively. 510 to 513 denote unit data of 8 bits which are stored in the internal register 500.

Here, consideration is given for outputting of data from the register 500 to respective ports 503, 504 505.

To the port 503 having the bit width of 32 bits, the data 510 to 513 as the content of the internal register 500 can be transferred as they are.

For the port 504 having the bit width of 16 bits, the data 510 to 513 are separated into upper 16 bits 510 and 511 and lower 16 bits 512 and 513 and then transmitted sequentially.

For the port 505 having the bit width of 8 bits, the data 510 to 513 are divided into respectively 8 bit segments and transmitted sequentially.

In order to realize the above-mentioned operation, the aligner 501 which can control the width of the data bus and align the value of the internal register 500 per 8 bit unit segment, is provided.

FIG. 6 shows a layout of the microprocessor having the bus sizing function. The reference numeral 201 denotes a microprocessor, and 202 denotes a data path for performing actual operation. The data path 202 is provided the bit width of 32 bits. The data path 202 is connected to data bus interface circuits 300(0) to 300(31) which exchanges data with an external data bus via internal data bus 20(0) to 20(31). The data bus interface circuit 300(0) to 300(31) are connected to pads 400(0) to 400(31) for connecting with respective external data bus. Here, it should be noted that the number within [] represent the bit number. Also, the number within ( ) corresponds to the bit number.

As shown, the data bus interface circuit 300(0) to 300(31) and the pad 400(0) to 400(31) are arranged in alignment.

The microprocessor 201 is provided with an internal data bus of 32 bits for communication. On the other hand, the resource, such as the memory, the I/O interface or so forth, is assumed to have 8 bits and 16 bits other than 32 bit bus. In order to be dynamically adapted with the external resource, the data bus interface circuit 300(0) to 300(31) selects the internal data bus 20(1) to 20(31) in 4 ways of combination so that the data can be input and output from the pad 400(0) to 400(31). Accordingly, for each data bus interface circuit, four internal data buses are wired. Then, with a control signal, one of the internal data paths is selected for inputting to or outputting from among four internal data buses.

In the microprocessor 201 shown in FIG. 6, when the bus sizing per 8 bits unit, data communication is performed with the external resource via eight pads 400(0) to 400(7).

For instance, the pad 400(0) connected to the data bus interface 300(0) is connected to the internal data buses 20(0), 20(8), 20(16), 20(24). In case of the bus sizing per 16 bits unit, the internal data buses 20(0) and 20(16) are selected in order.

Similarly, the pad 400(1) connected to the data bus interface 300(1) is connected to the internal data buses 20(1), 20(9), 20(17) and 20(25). In case of the bus sizing per 16 bits unit, the internal data buses 20(1) and 20(17) are selected in order.

Accordingly, when the bus width of the external resource is 8 bits, in which the data input and output is performed in time division manner for four times by making the bus to correspond to [0} bit to {7} bit of the external data bus, internal data bus 20(0) to 20(7), 20(8) to 20(15), 20(16) to 20(23) and 20(24) to 20(31) are connected to the pad 400(0) to 400(7) in order.

On the other hand, when the bus width of the external resource is 16 bits, in which the data input and output is performed in time division manner for two times by making the bus to correspond to [0} bit to {15} bit of the external data bus, internal data bus 20(0) to 20(15) 20(16) to 20(31) are connected to the pad 400(0) to 400(15) in order.

Here, observing a destination of connection of the internal data bus 20(0), due to 8 bit bus sizing, the internal data bus 20(0) is connected to the data bus interface 300 at 0th bit, 8th bit, 16th bit and 24th bit arranged at 8 bits distance. With respect to other internal data buses, each of the internal data bus is connected to four bus interface circuits arranged at 8 bit distance, in similar manner.

In order to connect four data bus interface circuits distanced from each other to one internal data bus, it becomes a construction having a plurality of wiring on a layout of a chip in actual wiring of the internal data bus so as to make the wiring length large. Increasing of the wiring length causes increasing of the capacity of the wiring to expand inputting set-up period and outputting delay period. Furthermore, increasing of the wiring length inherently causes increasing of the chip area.

SUMMARY OF THE INVENTION

Therefore, it is an object of the present invention to provide a microprocessor with a bus sizing function, which microprocessor can reduce a wiring capacity to reduce an inputting set-up period and an outputting delay period.

Another object of the invention is to provide a microprocessor with a bus sizing function, which can reduce an area required for wiring of internal data buses and thus can avoid increasing chip area.

In order to accomplish the above-mentioned objects, a microprocessor with a bus sizing function, according to one aspect of the present invention, comprises:

a data path performing arithmetic operation of data;

internal data bus and external data bus having $2^n$ bit width, in which n is a natural number, for inputting and outputting data to and from the data path;

$2^n$ interface circuits having a bus sizing function for using a bus of $2^m$ bits, in which m is a natural number smaller than n, the interface circuit being connected to $2^{n-m}$ of internal data buses;

$2^n$ pads for connecting the internal data bus to the external data bus via the interface circuit, among the interface circuit and the pads, $2^{n-m}$ of the interface circuits and the pads associated with common internal data bus are aggregated as a block and arranged at close proximity to each other.

Preferably, the interface circuit includes switching means for selectively switch $2^{n-m}$ of internal data buses connected thereto, to connect to the pad. Also, the internal data bus and the external data bus are 32 bits, each four of 32 interface circuits are connected to the internal data bus per every 8 bits, and among the interface circuit and the pad, four interface circuits and pads connected to common bit number of the internal data bus are aggregated into the block for establishing eight blocks for arrangement per block.

According to another aspect of the invention, a microprocessor with a bus sizing function comprises:

a data path performing arithmetic operation of data;

internal data bus and external data bus having $2^n$ bit width, in which n is a natural number, for inputting and outputting data to and from the data path;

$2^n$ interface circuits having a bus sizing function for using a bus of $2^m$ bits, in which m is a natural number smaller than n, the interface circuit being connected to $2^{n-m}$ of internal data buses;

$2^n$ pads for connecting the internal data bus to the external data bus via the interface circuit, $2^{n-m}$ of the pads having the same bit numbers to the internal data buses connected to the interface circuits are connected to the corresponding interface circuits and are aggregated for arrangement.

Preferably, the interface circuit includes means for selectively connecting the internal data bus connected thereto to the pad. The internal data bus and the external data bus are 32 bits, every two internal data buses are connected to 16 interface circuits per 16 bits, and two pads having the same bit numbers with the internal data buses connected to the interface circuits are arranged close proximity to relevant interface circuit in aggregating manner. Also, the interface circuit selectively connects one of two internal data buses having upper bit number and selectively connects one of the pads having lower bit number to the two internal data buses.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiments of the present invention will be discussed in detail with reference to the accompanying drawings.

Figure 1:
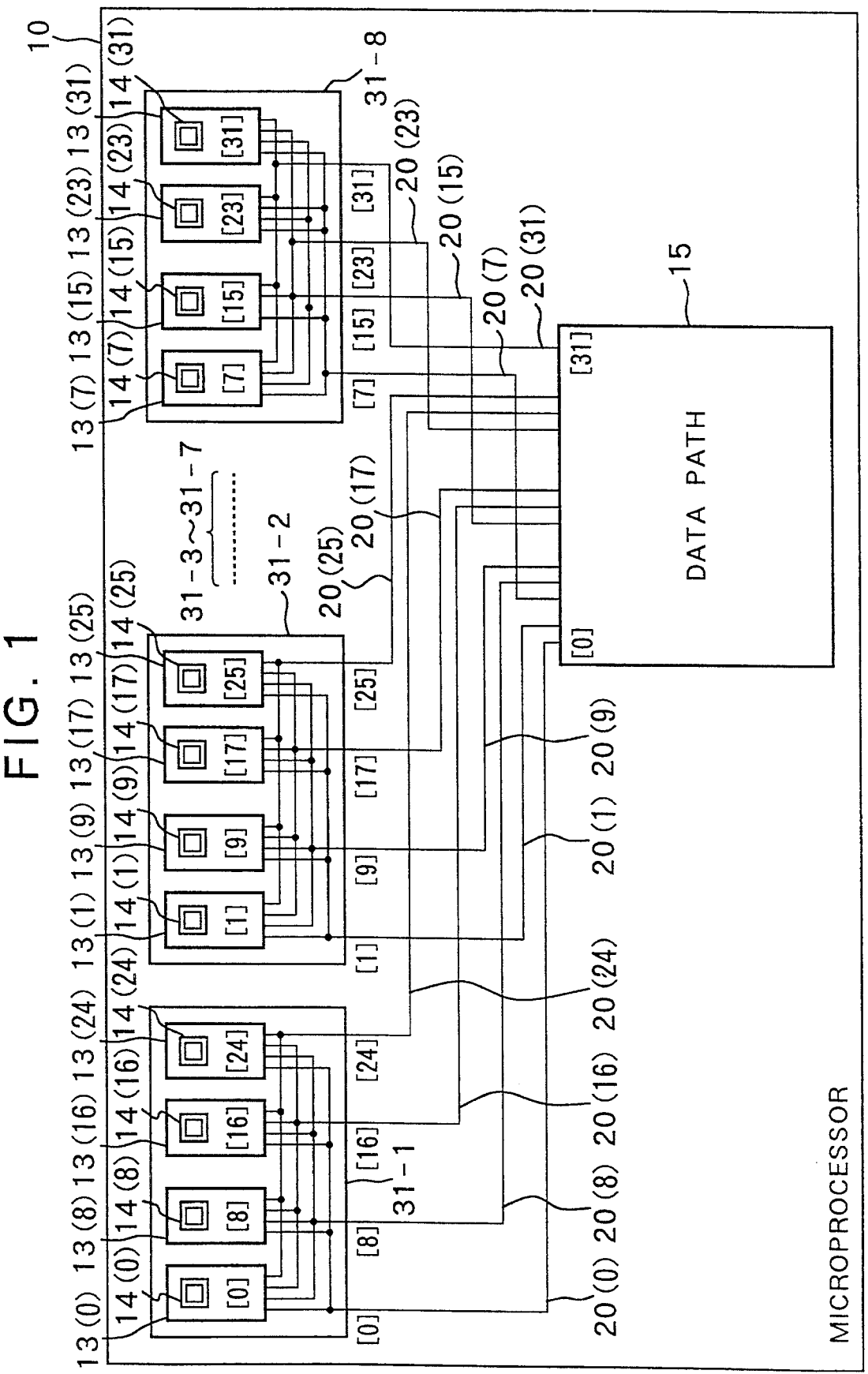
FIG. 1 is a block diagram showing a layout of the first embodiment of a microprocessor with a bus sizing function according to the present invention.

FIG. 1 is a diagrammatic illustration showing a layout of the first embodiment of a microprocessor with a bus sizing function according to the present invention. In FIG. 1, the reference numeral 10 denotes a microprocessor (showing a chip of a microprocessor), 15 denotes a data path which executes actual operation.

The data path 15 has a bus width of 32 bits. This data path 15 is connected to data bus interface circuits 13(0) to 13(31) which performs input/output operation between external data buses, via internal data buses 20(0) to 20(31). The data bus interface circuits 13(0) to 13(31) are connected to pads 14(0) to 14(31) which are adapted to be connected to the external data buses (not shown). Here, the number within [] represents a bit number, and the number within ( ) corresponding to the bit number.

Figure 2:
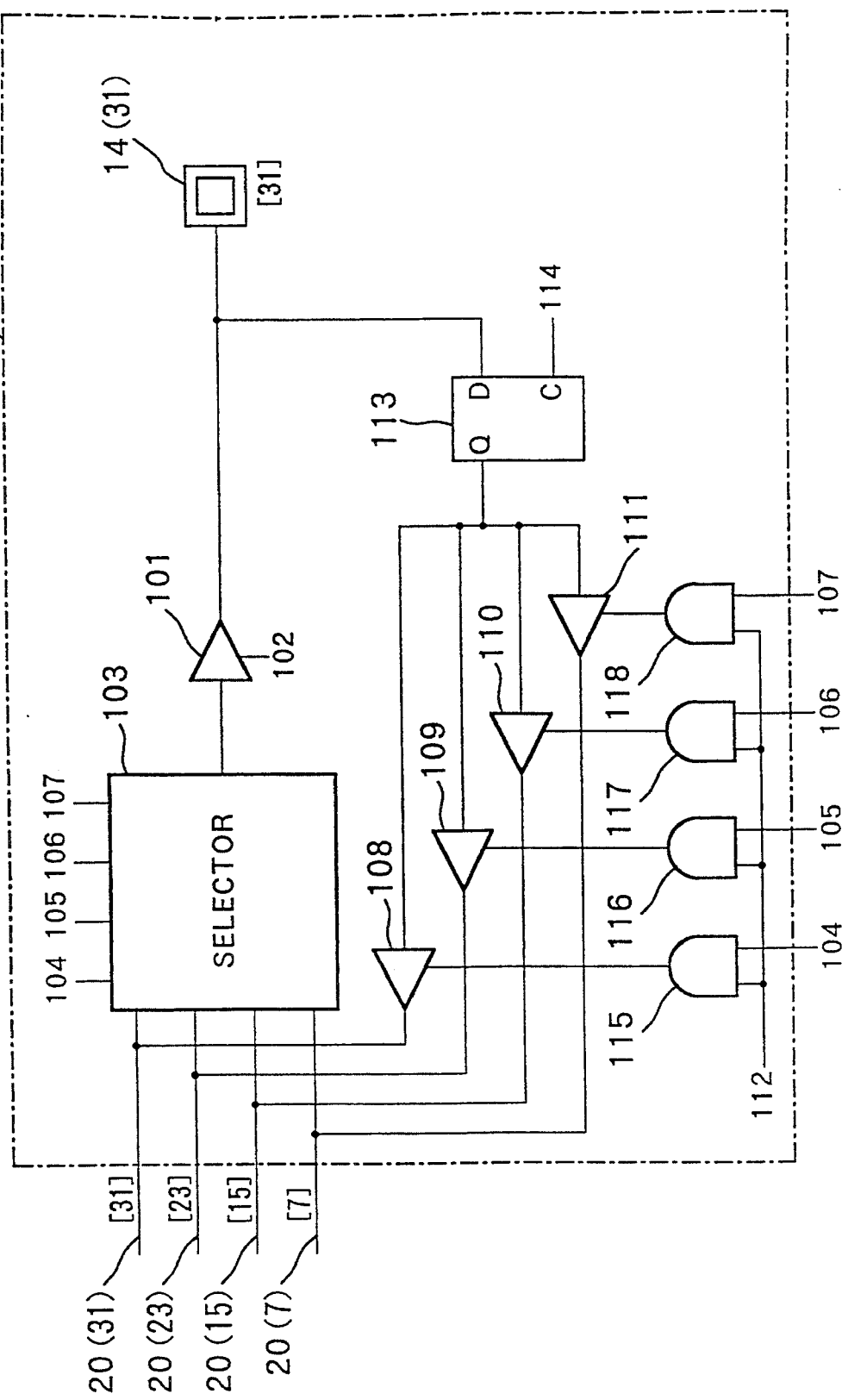
FIG. 2 is a block diagram showing a construction of a data bus interface circuit in the microprocessor of FIG. 1.

Here, discussion will be given for the circuit construction of the data bus interface circuits 13(0) to 13(31) with reference to FIG. 2. It should be appreciated that although FIG. 2 shows the circuit construction of the data bus interface circuit 13(31), other data bus interface circuits have substantially the same construction except for the internal data buses to be connected and the bit numbers.

The data bus interface circuit 13(31) includes a three state buffer 101, a selector 103, three state buffers 108 to 111, a latch circuit 113 and an AND circuit 115 to 118.

As shown, the internal data buses 20(7), 20(15), 20(23) and 20(31) are connected to the input of the selector 103. The output of the selector 103 is connected to the pad 14(31) via the three state buffer 101. On the other hand, the pad 14(31) which is located within the data bus interface circuit 13(31)) is connected to the input of the latch circuit 113. The output of the latch circuit 113 is connected to the internal data buses 20(7), 20(15), 20(23) and 20(31) via four three state buffers 108 to 111.

In case of data input, the data input from the pad 14(31) is latched by the latch circuit 113 with a clock 114. Furthermore, the three state buffers 108 to 111 are controlled by control signals 104 to 107 input through AND circuits 115 to 118 for selecting one of the internal data buses 20(7), 20(15), 20(23) and 20(31) for inputting.

In case of data output, one of the internal data buses 20(7), 20(15), 20(23) and 20(31) is selected on the basis of the control signals 104 to 107 for outputting by the selector 103. Then, the data from the selected internal data bus is output to the external data bus via the pad 14(31) in response to the input 102 of the three state buffer 101.

Next, discussion will be given for a method to realize the bus sizing employing the functions set forth above. The microprocessor 10 shown in FIG. 1 is provided with the internal data bus of 32 bits for communication. On the other hand, external resources, such as a memory, I/O device or so forth may have bus width of 8 bits and 16 bits in addition to 32 bits. In order to adapt to data transfer with these external resources, one of four ways of combinations of the internal data buses 20(0) to 20(31) is selected by the data bus interface circuits 13(0) to 13(31) so that data input and data output is performed by the pads 14(0) to 14(31) via the selected internal data bus.

In the microprocessor 10 shown in FIG. 1, when the bus sizing per 8 bit unit is performed, data input and data output is performed through eight pads 14(0) to 14(7). Namely, when 32 bit data is output from the microprocessor 10, the 32 bit data is divided into respective 8 bits data segments so that respective 8 bit data segments are output through the pads 14(0) to 14(7) in order.

For instance, the pad 14(0) connected to the data bus interface circuit 13(0) is connected to the internal data bus 20(0), 20(8), 20(16) and 20(24). In case of the bus sizing of 8 bits, the internal data buses are selected by the control signals in order for performing inputting and outputting. Namely, upon inputting and outputting of the first 8 bits, a connection between the pad 14(0) and the internal data bus 20(0) is established. Upon inputting and outputting of the next 8 bits, the connection between the pad 14(8) and the internal data bus 20(8) is established. Sequentially, the connections between pad 14(0) and the internal data buses 20(16) and 20(24) are established in order. In case of the bus sizing per 16 bit unit, the internal data buses 20(0) and 20(16) are selected in order.

Similarly, the pad 14(1) to be connected to the data bus interface circuit 13(1) is connected to the internal data buses 20(1), 20(9), 20(17) and 20(25). In case of the bus sizing per 8 bit unit, these internal data buses are selected by the control signals in order to perform inputting and outputting. In case of the bus sizing per 16 bit unit, the internal data buses 20(1) and 20(17) are selected.

Accordingly, for example, when the bus width of the external resource is 8 bits, in which data inputting and data outputting is performed four times in time sharing manner with establishing correspondence between the internal data buses and [0] to [7] bits of the external data bus, the internal data buses 20(0) to 20(7), 20(8) to 20(15), 20(16) to 20(23) and 20(24) to 20(31) are connected to the pads 14(0) to 14(7), in order.

On the other hand, when the bus width of the external resource is 16 bits, in which data inputting and data outputting is performed twice in time sharing manner with establishing correspondence between the internal data buses and [0] to [15] bits of the external data bus, the internal data buses 20(0) to 20(15) and 20(16) to 20(31) are connected to the pads 14(0) to 14(15), in order.

On the other hand, in case that the bus width of the external resource is 32 bits, the pads 14(0) to 14(31) are connected to the internal data buses 20(0) to 20(31).

In the shown embodiment, the data bus interface circuits having common internal data buses are divided into 8 blocks so that the data bus interface circuits are arranged for respective blocks.

For instance, concerning the data bus interface circuits 13(0), 13(8), 13(16) and 13(24), the internal data buses 20(0), 20(8), 20(16) and 20(24) are connected in common. Therefore, these data bus interface circuits are aggregated as a first block 31-1 and arranged in mutually adjacent relationship as shown.

On the other hand, concerning the data bus interface circuits 13(1), 13(9), 13(17) and 13(25), the internal data buses 20(1), 20(9), 20(17) and 20(25) are connected in common. Therefore, these data bus interface circuits are aggregated as a first block 31-2 and arranged in mutually adjacent relationship as shown.

Similarly, the data bus interface circuits having common internal data buses are aggregated as blocks 31-3 to 31-8. In FIG. 1, the blocks 31-3 to 31-7 are neglected from illustration for simplification of illustration. In the third block 31-3, the data bus interface circuits 13(2), 13(10), 13(18) and 13(26) having common internal data buses 20(2), 20(10), 20(18) and 20(26) are aggregated.

In the fourth block 31-4, the data bus interface circuits 13(3), 13(11), 13(19) and 13(27) having common internal data buses 20(3), 20(11), 20(19) and 20(27) are aggregated.

In the fifth block 31-5, the data bus interface circuits 13(4), 13(12), 13(20) and 13(28) having common internal data buses 20(4), 20(12), 20(20) and 20(28) are aggregated.

In the sixth block 31-6, the data bus interface circuits 13(5), 13(13), 13(21) and 13(29) having common internal data buses 20(5), 20(13), 20(21) and 20(29) are aggregated.

In the seventh block 31-7, the data bus interface circuits 13(6), 13(14), 13(22) and 13(30) having common internal data buses 20(6), 20(14), 20(22) and 20(30) are aggregated.

As shown, in the third block 31-8, the data bus interface circuits 13(7), 13(15), 13(23) and 13(31) having common internal data buses 20(7), 20(15), 20(23) and 20(31) are aggregated.

Figure 3:
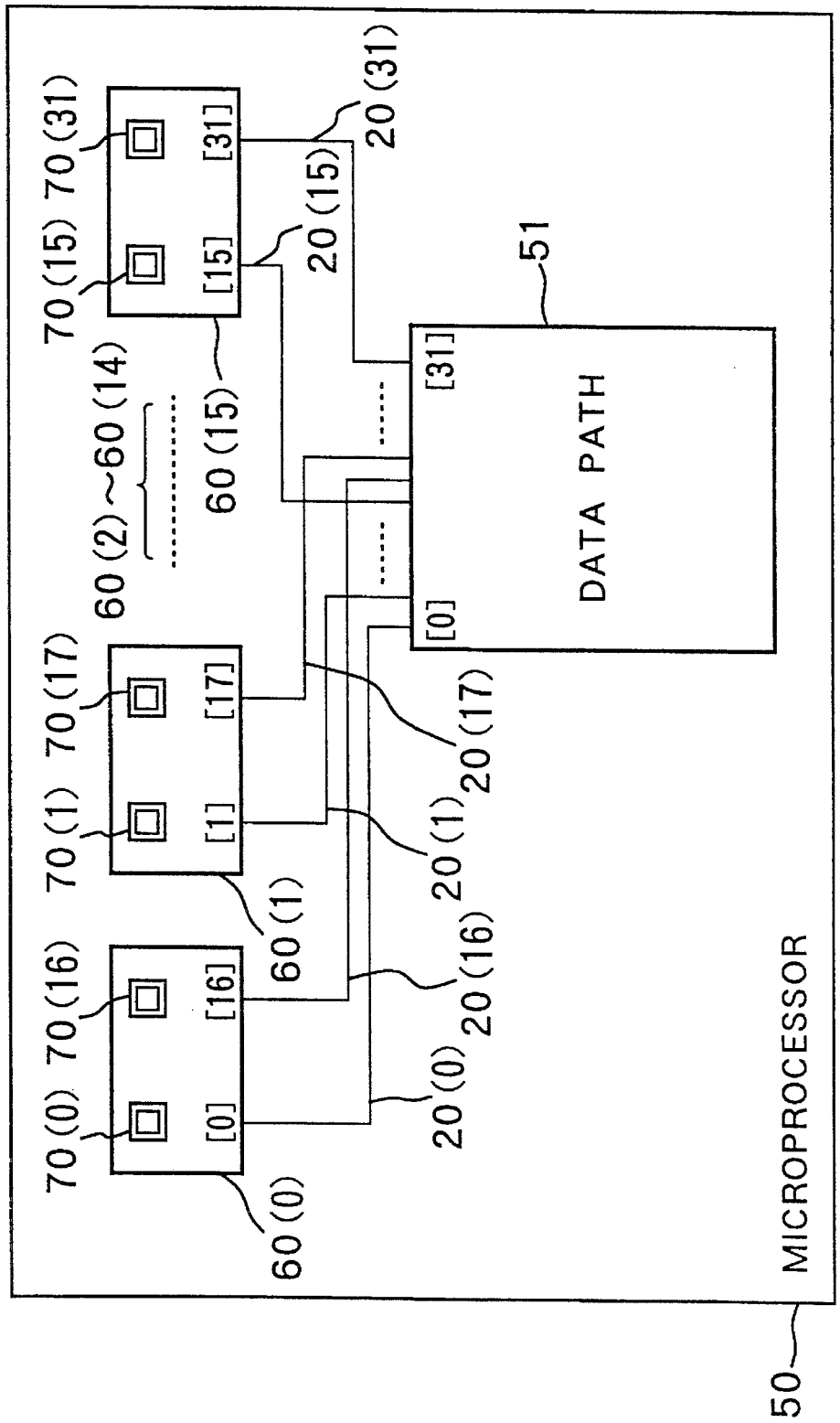
FIG. 3 is a block diagram showing a layout of the second embodiment of a microprocessor with a bus sizing function according to the present invention.

FIG. 3 shows a layout of the second embodiment of a microprocessor with the bus sizing function according to the present invention. In this embodiment, the microprocessor 50 has only bus sizing function per 16 bit unit. The microprocessor comprises a data bus 51, 16 data bus interface circuits 60(0) to 60(15), 32 pads 70(0) to 70(31), and internal data buses 20(0) to 20(31) connecting the data bus 51 and the data bus interface circuits 60(0) to 60(15). It should be noted that data bus interface circuits 60(2) to 60(14) are neglected from illustration for simplification of illustration.

In the second embodiment, as shown, for 16 data bus interface circuits 60(0) to 60(15), respective two pads 70(0) and 70(16), 70(1) and 70(17), 70(2) and 70(18), 70(3) and 70(19), 70(4) and 70(20), 70(5) and 70(21), 70(6) and 70(22), 70(7) and 70(23), 70(8) and 70(24), 70(9) and 70(25), 70(10) and 70(26), 70(11) and 70(27), 70(12) and 70(28), 70(13) and 70(29), 70(14) and 70(30), and 70(15) and 70(31) are connected. Then, to respective pads, corresponding bit number of internal data buses are connected.

One internal data bus is connected to only one data bus interface circuit and does not branched to be connected to other data bus interface circuit.

Figure 4:
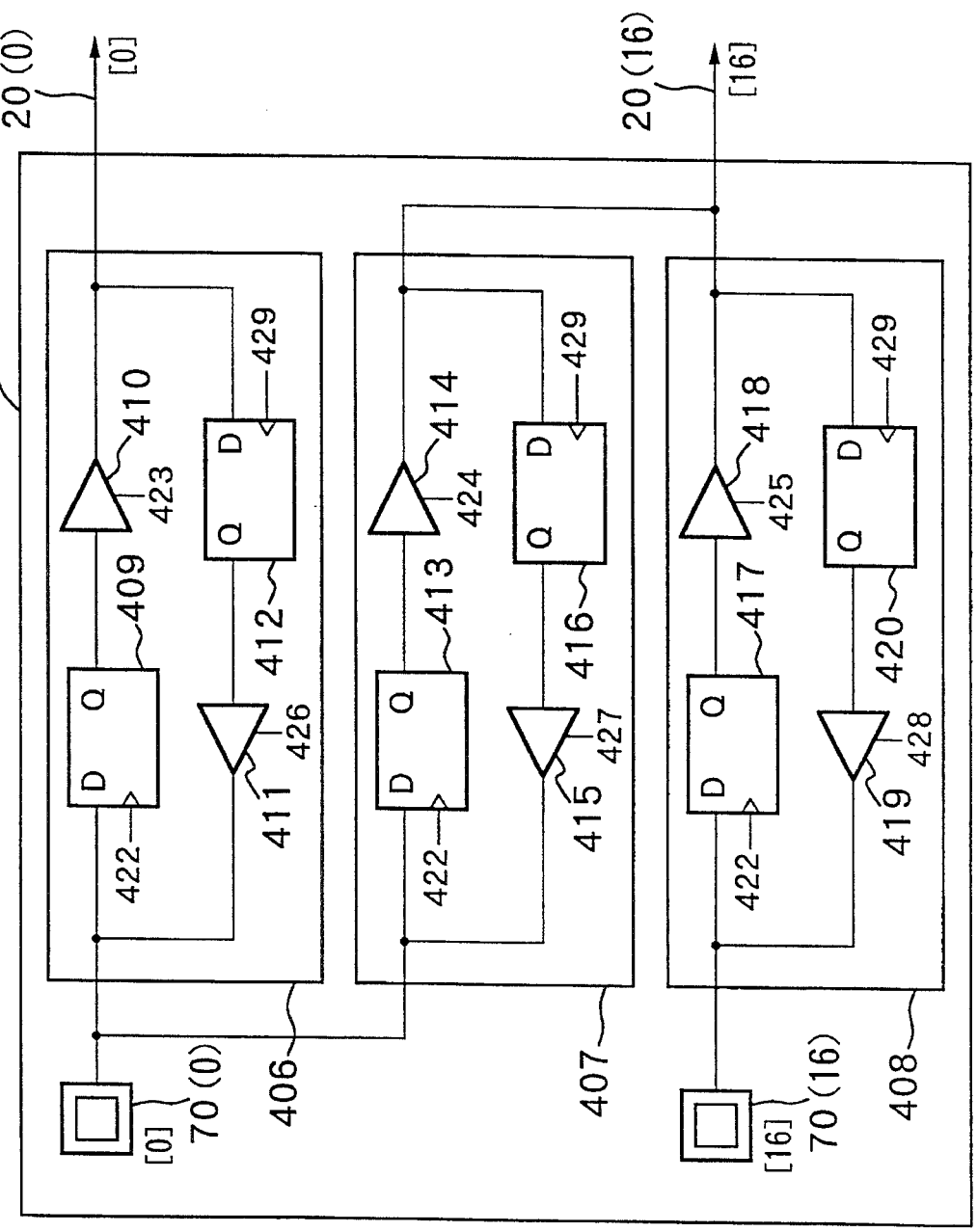
FIG. 4 is a block diagram showing a construction of a data bus interface circuit in the microprocessor of FIG. 3.
Figure 5:
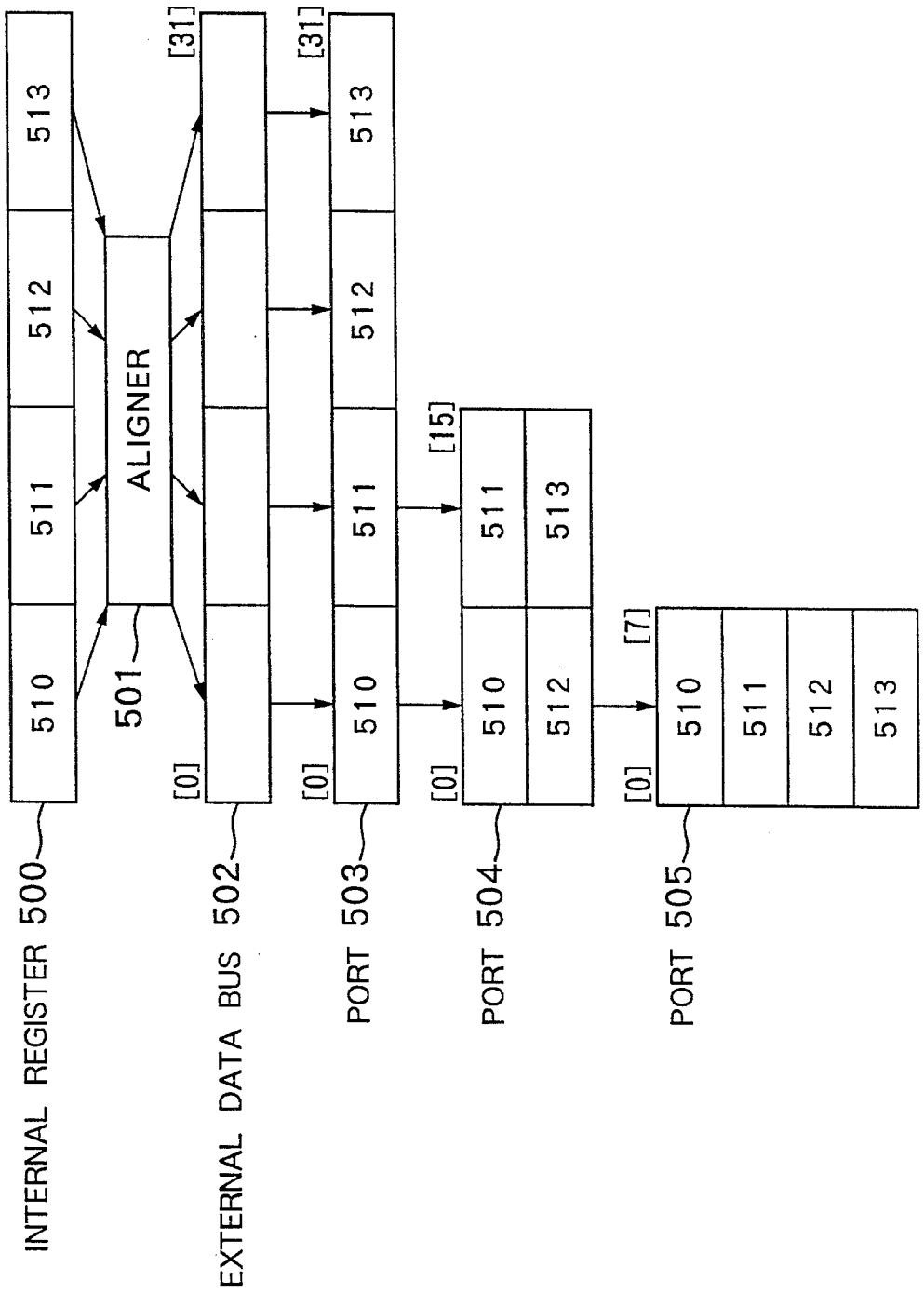
FIG. 5 is a block diagram showing a layout of the conventional microprocessor with the bus sizing function.
Figure 6:
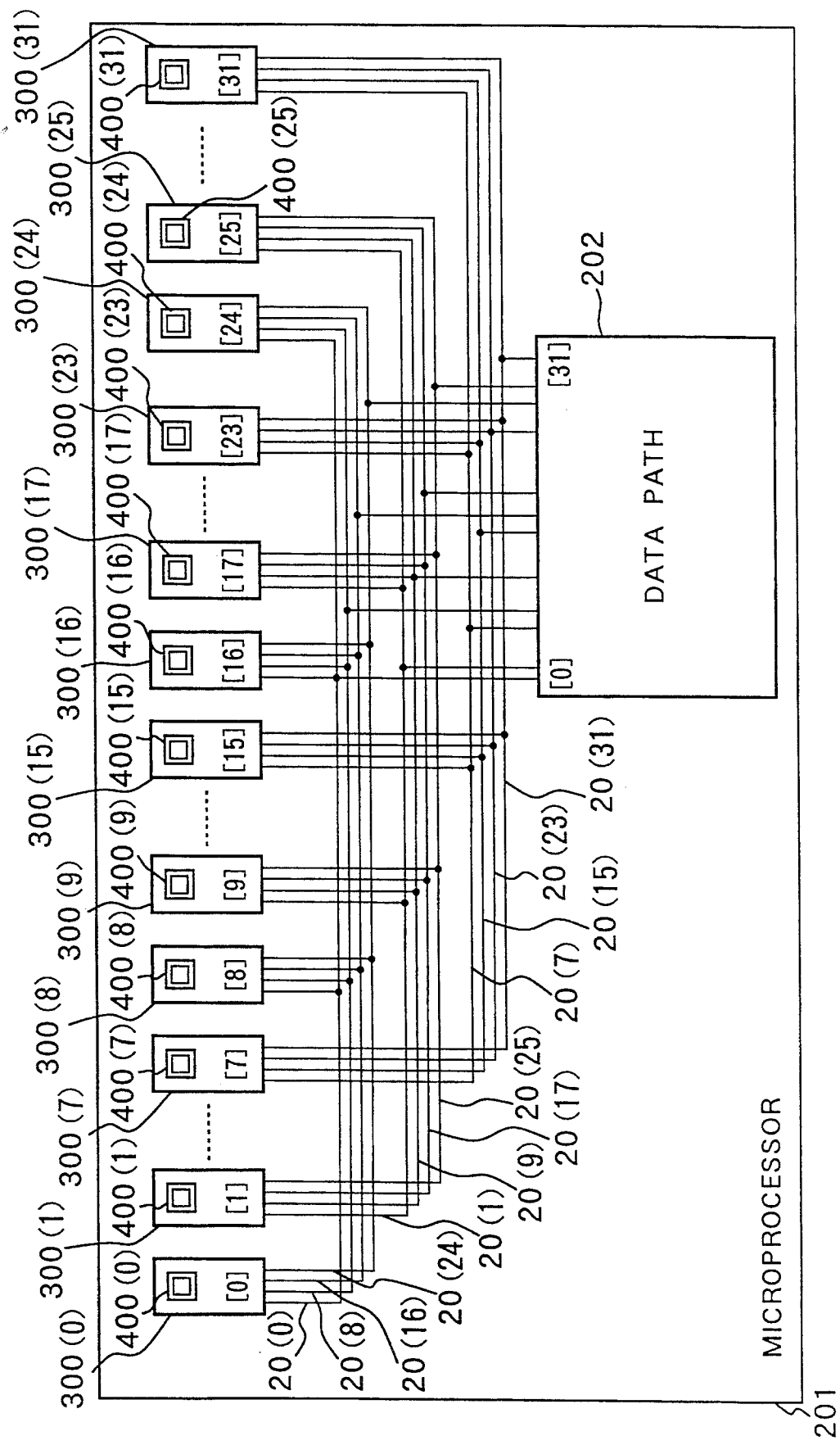
FIG. 6 is an explanatory illustration showing an example of bus sizing operation.

Here, the circuit construction of the data bus interface circuit will be discussed with reference to FIG. 4. Although there is illustrated the data bus interface circuit 60(0), other data bus interface circuits have the identical construction except for the internal data buses to be connected and the bit numbers.

The data bus interface circuit 60(0) has three interface circuits 406, 407 and 408. The interface circuit 406 comprises an input signal latch 409, an output signal latch 412, and three state buffers 410 and 411. The interface circuit 407 comprises an input signal latch 413, an output signal latch 416 and three states buffers 414 and 415. The interface circuit 408 comprises an input signal latch 417, an output signal latch 420 and three states buffers 418 and 419.

Here, the pad 70(0) is connected to the internal data buses 20(0) and 20(16) via the interface circuits 406 and 407. The pad 70(16) is connected to the internal data bus 20(16) via the interface circuit 408.

The data input to the input signal latches 409, 413 and 417 from the pads 70(0) and 70(16) is transferred to the input data buses 20(0) or 20(16) in synchronism with a clock 422 while the inputs 423 to 424 of the three state buffers 410, 414 and 428 are active.

The data transferred to the output signal latches 412, 416 and 420 from the internal data bus 20(0) or 20(16) is output through the pads 70(0) and 70(16) in synchronism with a clock 429 while the inputs 426 to 428 of the three state buffers 411, 415 and 419 are active.

The second embodiment of the microprocessor 50 is differentiated from that of the first embodiment, in that it is provided only 16 bit bus sizing function, and it does not supports mis-align access. Other operations are the same as those of the first embodiment. Here, discussion will be given for the mis-align access. For the purpose of illustration, the discussion will be exemplarily given for the case where the data is read out from a memory which can be accessed with 32 bits. In typical manner of access with 32 bits, 32 bits of address 0 to 3 and 32 bits of address 4 to 7 are read in 0 to 31 bits of the data path. For instance, when 32 bits are to be read in from an address 1, among 32 bits of the addresses 0 to 3, 24 bits of the address 1 to 3 are read in 0 to 23 bits of the data buses, initially. Then, among 32 bits of the address 4 to 7, 8 bit of the address 4 is read in 24 to 31 bits of the data buses. Such access, in which bit is switched, is called as mis-align access.

Since the second embodiment does not support the mis-align access, only each one internal data buses are connected to respective pads 70(16) to 70(31) of upper 16th to 32th bits to permit simplification of the circuit construction. Also, by arranging the output signal latch adjacent the pad, the output delay period can be shortened.

Typically, the wiring capacity per one wiring between the data bus 15 to the internal data bus 20(1) to 20(31) is proportional to a total sum of the length of the wirings to be connected. The delay period is increased according to increasing of the wiring capacity. Therefore, shortening of the wiring of the data bus, the delay period can be shortened.

Reduction of the total sum of the wiring length of the internal data bus of 32 bits with the arrangement illustrated with respect to the shown embodiment will be discussed hereinafter. In the following discussion, the distance between the pads are assumed as d.

The width of the data bus is approximately 2 to 3 μm which is much smaller than an average distance (approximately 150 μm) between the pads of the internal data bus. Therefore, the width of the data bus per se will not be taken into account. Also, since the distance from the data bus to the pad in the vertical direction (up and down direction in the drawing) is much smaller than the distance of the pad aligning direction (lateral direction in the drawing), the distance between the data bus and the pad in the vertical direction is ignored.

In the conventional microprocessor, maximum value of the wiring length of one internal data bus extending from the certain bit of the data bus can be expressed by approximately 23×d to 31×d. The maximum value is variable depending upon the position of the data bus relative to the pad.

The wiring length of the overall internal data buses (32 data buses) becomes 3×8 d per one internal data bus, since the wiring of one internal data bus is connected to four pads (data bus interface) distanced at every 8 bits. Accordingly, the overall wiring length becomes approximately 32×(2×8 d)=768 d.

In the conventional microprocessor, the internal data bus extending from the data path is wired in distributing manner to four data bus interface circuits distanced at every 8 bits. In contrast, in the first embodiment, the internal data bus 20(0) to 20(31) extend from the data path 15 to the predetermined data bus interface circuit and are wired with branching to four data bus interface circuits which are mutually distanced for 3 bits in the same block. Accordingly, the wiring is not distributed in the wide area.

When the data path 15 is arranged at the center of the row of pads 14(1) to 14(31) [data bus interface circuits 13(1) to 13(31)], the maximum value of the wiring of one internal data bus becomes approximately 15 d. Therefore, in comparison with the conventional construction, maximum length of the wiring per one internal data bus can be shortened to be 0.5 to 0.65 times of that of the conventional construction.

Also, the overall wiring length of 32 internal data bus can be significantly reduced. In case of the first embodiment, the wiring length of four internal data buses extending to each block can be made substantially equal to the distance from the data path 15 to each block.

Here, consideration is given for the case where the data path 15 is arranged in the vicinity of the right or left end block. The wiring length of the four internal data bus extending to the block (block 31-1 or 31-8) located in vertical alignment (upper side in the drawing) becomes the length to mutually connect the four data bus interface circuits since the width of the data path per se is ignored. Therefore, the wiring length per each internal data bus becomes 3 d.

The wiring length of the next adjacent block becomes a sum of the distance to the block closest to the data path 15 and the wiring length (=3 d) within the block. In the shown case, since the lateral length of one block is 3 d, the distance to the block closest to the data path 15 becomes 4 d. Accordingly, the wiring length of the internal data bus becomes 7 d (=3 d+4 d) per each internal data bus. It should be noted that the distance between the adjacent blocks is assumed to be d.

Similarly, the wiring length of the internal data bus of the block most distanced from the data path 15 becomes a sum of the distance (=28 d) to the pad (data bus interface circuit) closest to the data path 15 and the wiring length (3 d) within the block.

In this case, the overall wiring length of the 32 internal data bus can be expressed as follows:

$$\sum_{i=0}^{7} \{4 \times (4i+3)d\} = 544d$$

Therefore, the overall wiring length becomes approximately 0.7 times of that of the conventional construction. By this, the delay of data can be significantly improved. Also, such reduction of the wiring length can contribute to reduction of the chip area.

Also, in the second embodiment, the pads using the common internal data bus are connected to the same data bus interface circuit in a group. Therefore, the maximum wiring length in one internal data bus becomes approximately 15×d similarly to the first embodiment.

Here, the wiring length of two internal data buses extending to the data bus interface circuit 60(0) or 60(15) located in vertical alignment (upper side in the drawing) with the data path 51 becomes 0 in one internal data bus and 1 d in the other internal data bus, since the width of the data path 51 per se is ignored. Therefore, the sum of the wiring length of two internal data buses becomes 1 d.

The wiring length of the internal data bus extending to the adjacent next data bus interface circuit becomes 2 d as the distance to the pad of the same data bus interface circuit, closest to the data path 51 and 3 d as a distance to the other pad. Therefore, the sum of the wiring length of two internal data buses becomes 5 d.

Similarly, the wiring length of the internal data bus to the data bus interface circuit most distant from the data path 51 becomes 30 d at the pad of the data bus interface circuit closer to the data path 51 and 30+1 d at the other pad. Therefore, the sum of the wiring length of two internal data buses becomes 61 d.

From the above, the overall wiring length of 32 internal data buses can be expressed by:

$$\sum_{i=0}^{15} (2 \times 2i + 1)d = 496d$$

Therefore, in the second embodiment, the overall wiring length can be reduced to be approximately 0.64 times of that of the conventional construction.

As set forth above, by constructing the microprocessor as illustrated in terms of the preferred embodiments, reduction of the input set-up period can be realized. Namely, the data path input set-up period and the output delay period is determined depending upon the critical bit which takes the longest period among the data bus, namely the bit having the longest total wiring length. Since the present invention can reduce the maximum wiring length to be approximately half of that of the prior art, the input set-up period and the output delay period can be significantly reduced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

For instance, although the foregoing discussion 20 has been given in terms of 32 bit-microprocessor, the invention is equally applicable for $2^n$ (n is natural number) bit microprocessor.

What is claimed is:

1. A microprocessor with a bus sizing function comprising:

a data path for performing arithmetic operation of data;

an internal data bus and art external data bus each having a $2^n$ bit width, in which n is a natural number, for inputting and outputting data to and from said data path;

$2^n$ interface circuits each having a bus sizing function for using said internal data bus and said external data bus as a bus having a width of $2^m$ bits, in which m is a natural number smaller than n, each said interface circuit being connected to $2^{n-m}$ of internal data buses per every $2^m$ bits; and $2^n$ pads for respectively connecting said internal data bus to the external data bus via respective ones of said interface circuits, wherein, among said interface circuits and said pads, $2^{n-m}$ of said interface circuits and said pads connected to common bit numbers of said internal data buses are aggregated as blocks for establishing $2^m$ blocks, and the $2^m$ blocks are arranged adjacent each other, each said interface circuit including said bus sizing function therein to thereby reduce a number and length of said internal busses and being arranged outside of said data path and including switching means for selectively switching $2^{n-m}$ of internal data buses connected thereto, to connect to respective ones of said pads.

2. A microprocessor with a bus sizing function as set forth in claim 1, wherein said internal data bus and said external data bus each have a width of 32 bits, each four of 32 interface circuits are connected to said internal data bus per 8 bits, and among said interface circuit and said pad, four interface circuits and pads connected to common bit numbers of said internal data buses are aggregated into said blocks for establishing eight blocks.

3. A microprocessor with bus sizing function as set forth in claim 1, wherein said switching means of each of said interface circuits comprises:

a selector connected to said $2^{n-m}$ internal data buses and said pad; and $2^{n-m}$ AND circuits for receiving a control signal from said selector for transmission of data between said $2^{n-m}$ internal data buses and said pad.

4. A microprocessor with bus sizing function as set forth in claim 3, further comprising:

a first three-state buffer connected to said selector for transmission of data to said pad; and $2^{n-m}$ three-state buffers for receiving said control signal from said $2^{n-m}$ AND circuits for transmission of data between said $2^{n-m}$ internal data buses and said pad.

5. A microprocessor with bus sizing function as set forth in claim 4, further comprising an intermediate latch circuit connected to said pad wherein said $2^{n-m}$ three-state buffers receive said control signal for allowing said transmission of data between said $2^{n-m}$ internal data buses and said pad through said intermediate latch circuit.

6. A microprocessor with bus sizing function as set forth in claim 1 wherein said switching means of each of said interface circuits comprises:

a selector connected to said $2^{n-m}$ internal data buses for generating a control signal, $2^{n-m}$ AND circuits for receiving said control signal, a first three-state buffer connected to said selector for transmission of data to said pad, $2^{n-m}$ three-state buffers coupled to said $2^{n-m}$ AND circuits, and an intermediate latch circuit coupled to said pad, wherein said $2^{n-m}$ three-state buffers receive said control signal from said $2^{n-m}$ AND circuits for transmission of data between said $2^{n-m}$ internal data buses and said pad through said intermediate latch circuit.

7. A microprocessor with a bus sizing function as set forth in claim 1, wherein said internal data bus and said external data bus each have a width of 32 bits, each four of 32 interface circuits are connected to said internal data bus per 8 bits, and four interface circuits and pads connected to common bit numbers of said internal data busses are aggregated into said blocks for establishing eight blocks, wherein each said switching means of said 32 interface circuits comprises:
a selector connected to said $2^{n-m}$ internal data buses for generating a control signal;
$2^{n-m}$ AND circuits for receiving said control signal;
a first three-state buffer connected to said selector for transmission of data to said pad;
$2^{n-m}$ three-state buffers coupled to said $2^{n-m}$ AND circuits; and
an intermediate latch circuit coupled to said pad, and
said $2^{n-m}$ three-state buffers control said $2^{n-m}$ AND circuits for transmission of data between said $2^{n-m}$ internal data buses and said pad through said intermediate latch circuit.

8. A microprocessor with a bus sizing function comprising:
a data path for performing arithmetic operation of data;
an internal data bus and an external data bus each having a $2^n$ bit width, in which n is a natural number, for inputting and outputting data to and from said data path;
$2^n$ interface circuits each having a bus sizing function for using said internal data bus and said external data bus as a bus having a width of $2^m$ bits, in which m is a natural number smaller than n, each said interface circuit being connected to $2^{n-m}$ of internal data buses per every $2^m$ bits; and
$2^n$ pads for respectively connecting said internal data bus to the external data bus via respective ones of said interface circuits,
wherein $2^{n-m}$ of said pads, having the same bit numbers as said internal data buses connected to said interface circuits, are connected to corresponding interface circuits and are aggregated for arrangement,
each said interface circuit including said bus sizing function therein to thereby reduce a number and length of said internal busses and being arranged outside of said data path and including switching means for selectively switching $2^{n-m}$ of internal data buses connected thereto, to connect to respective ones of said pads.

9. A microprocessor with a bus sizing function as set forth in claim 8, wherein said internal data bus and said external data bus each have a width of 32 bits, every two internal data buses are connected to 16 interface circuits per 16 bits, and two pads having the same bit numbers with the internal data buses connected to said interface circuits are respectively arranged adjacent to respective ones of said interface circuits in aggregation.

10. A microprocessor with a bus sizing function as set forth in claim 9, wherein said interface circuit selectively connects one of two internal data buses having an upper bit number and selectively connects one of the pads having a lower bit number to said two internal data buses.

11. A microprocessor with bus sizing function as set forth in claim 8, wherein said means for selectively connecting comprises a plurality of internal interface circuits for connecting said $2^{n-m}$ pads to said internal data buses and for transmission of data between said $2^{n-m}$ pads and said internal data buses.

12. A microprocessor with bus sizing function as set forth in claim 11, wherein each of said internal interface circuits comprises an input three-state buffer coupled to said internal data bus and
an input signal latch coupled to said input three-state buffer for connecting one of said $2^{n-m}$ pads to respective ones of said internal data buses through said input three-state buffer and for transmission of data between said $2^{n-m}$ pads and said internal data buses.

13. A microprocessor with bus sizing function as set forth in claim 12, wherein each said internal interface circuit comprises
an output three-state buffer coupled to one of said $2^{n-m}$ pads and
an output signal latch coupled to said output three-state buffer for connecting one of said $2^{n-m}$ pads to respective ones of said internal data buses through said output three-state buffer and for transmission of data between said $2^{n-m}$ pads and said internal data buses.

14. A microprocessor with bus sizing function as set forth in claim 8, wherein said means for selectively connecting comprises
a plurality of internal interface circuits for connecting said $2^{n-m}$ pads to said internal data buses,
wherein each of said internal interface circuits comprises
an input three-state buffer coupled to said internal data bus
an output three-state buffer coupled to one of said $2^{n-m}$ pads
an input signal latch coupled to said input three-state buffer for connecting one of said $2^{n-m}$ pads to respective ones of said internal data buses through said input three-state buffer for transmission of data between said $2^{n-m}$ pads and said internal data buses and
an output signal latch coupled to said output three-state buffer for connecting one of said $2^{n-m}$ pads to respective ones of said internal data buses through said output three-state buffer for transmission of data between said $2^{n-m}$ pads and said internal data buses.

15. A microprocessor with a bus sizing function as set forth in claim 8, wherein said internal data bus and said external data bus each have a width of 32 bits, every two internal data buses are connected to 16 interface circuits per 16 bits, and two pads having the same bit numbers with the internal data buses connected to said interface circuits are respectively arranged adjacent to respective ones of said interface circuits in aggregation,
said means for selectively connecting including a plurality of internal interface circuits for connecting said two pads to said internal data buses,
wherein each of said internal interface circuits comprises:
an input three-state buffer coupled to said internal data bus;
an output three-state buffer coupled to one of said two pads;
an input signal latch coupled to said input three-state buffer for connecting one of said two pads to respective ones of said internal data buses through said input three-state buffer for transmission of data between said two pads and said internal data buses; and
an output signal latch coupled to said output three-state buffer for connecting one of said two pads to respective ones of said internal data buses through said output three-state buffer for transmission of data between said two pads and said internal data buses.

16. A microprocessor with a bus sizing function comprising:
- a data path for performing an arithmetic operation of data;
- an internal data bus and an external data bus having a $2^n$ bit width, in which n is a natural number, for inputting and outputting data to and from said data path;
- $2^n$ interface circuits having a bus sizing function for using said internal data bus and external data bus having a width of $2^m$ bits, in which m is a natural number smaller than n, each said interface circuit being respectively connected to $2^{n-m}$ of internal data buses per every $2^m$ bits; and
- $2^n$ pads for respectively connecting said internal data bus to the external data bus via respective ones of said interface circuits,
- said interface circuits and said pads being divided into $2^m$ blocks per every $2^{n-m}$ of said interface circuits and said pads being connected to common bit numbers of said internal data bus, the $2^m$ blocks being arranged adjacent each other,
- each said interface circuit including said bus sizing function therein to thereby reduce a number and length of said internal busses and being arranged outside of said data path and including switching means for selectively switching $2^{n-m}$ of internal data buses connected thereto, to connect to respective ones of said pads.

17. A microprocessor with a bus sizing function as set forth in claim 16, wherein said internal data bus and said external data bus each have a width of 32 bits, each four of 32 interface circuits are connected to said internal data bus per 8 bits, and four interface circuits and pads connected to common bit numbers of said internal data busses are aggregated into said blocks for establishing eight blocks,
- wherein each of said switching means of said 32 interface circuits comprises:
  - a selector connected to said $2^{n-m}$ internal data buses for generating a control signal;
  - $2^{n-m}$ AND circuits for receiving said control signal;
  - a first three-state buffer connected to said selector for transmission of data to said pad; n-m $2^{n-m}$ three-state buffers coupled to said $2^{n-m}$ AND circuits; and
  - an intermediate latch circuit coupled to said pad, and
- said $2^{n-m}$ three-state buffers control said $2^{n-m}$ AND circuits for transmission of data between said $2^{n-m}$ internal data buses and said pad through said intermediate latch circuit.

18. A microprocessor with a bus sizing function as set forth in claim 16, wherein each of said switching means of said interface circuits comprises:
- a selector connected to said $2^{n-m}$ internal data buses and said pad; and
- $2^{n-m}$ AND circuits for controlling transmission of data between said $2^{n-m}$ internal data buses and said pad.

* * * * *